United States Patent Office 3,160,770
Patented Dec. 8, 1964

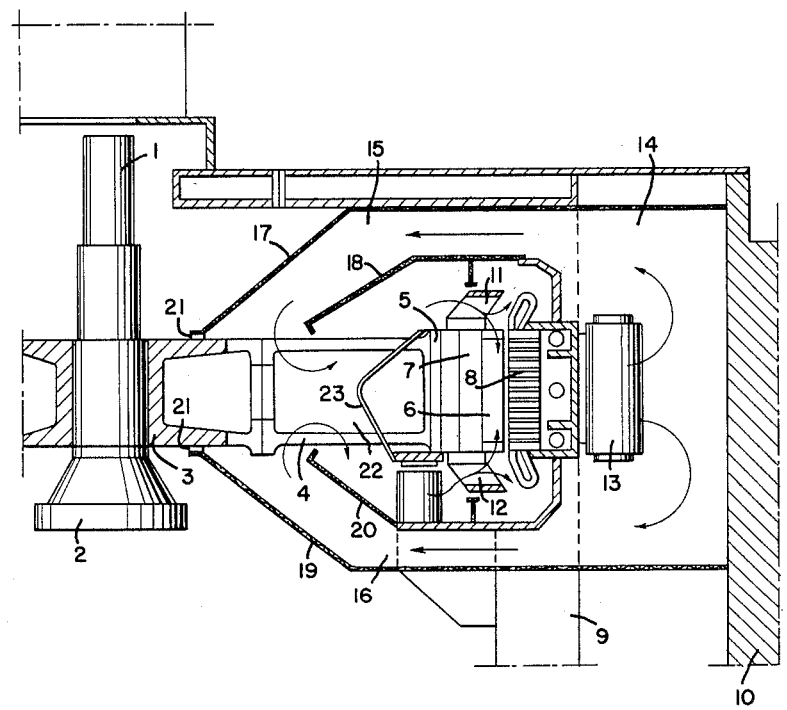

3,160,770
VENTILATING ARRANGEMENTS FOR AN ALTERNATOR WITH A ROTOR OF LARGE DIAMETER
Paul Asantcheeff, Beauchamp, France, assignor to Le Materiel Electrique S.W., Paris, France, a company of France
Filed July 10, 1962, Ser. No. 208,755
Claims priority, application France, July 13, 1961, 867,969
3 Claims. (Cl. 310—57)

The object of the present invention is to provide improvements in ventilating arrangements for an alternator with a rotor of large diameter provided with coupling arm between the hub of the rotor and the rim.

To effect a simultaneous ventilation of the rotor and of the stator of an alternator, it is known to provide two centrifugal ventilators formed of vanes fixed on the rotor, in the region of its periphery, on either side of the rotor. Each of these ventilators draws air to the interior of the alternator or into a chamber separated from the central part of the alternator by a substantially sealing tight partition; the air drawn in is forced, by way of the spaces between the pole pieces of the rotor and ventilation passages provided in the stator, towards coolers located around the stator, whence the cooled air passes into a peripheral collector which communicates, according to the arrangement, either with the interior of the alternator or the chamber formed by the partition.

In these known arrangements, the volume of air in circulation is relatively limited; on the other hand, the intake of the ventilators is upset because of the disturbance of the air by the arms of the rotor, the effect of this disturbance being to oppose normal feed of the intake side of the ventilators with air provided from the collector.

The improvements which are the object of the invention enable the output of the peripheral ventilators to be increased by improving the conditions in which the feed of these ventilators is effected.

According to the invention there is provided ventilator arrangement for alternators provided with coupling arms between the rotor hub and the rim, and comprising two centrifugal ventilators located on either side of the rotor in the peripheral zone of the rotor, characterised in that it comprises, in one at least of two chambers separated by the rotor, a fixed circular screen, located so as to direct the air from the peripheral collector towards the central part of the alternator, the said screen being profiled so that the central part of the alternator communicates with the intake side of the two peripheral ventilators only by way of the space swept by the rotor arms, this forming a primary ventilator of which the vanes are formed by the rotor arms.

In the single figure of the attached drawing there is shown more or less schematically, and there is hereafter described, a particular embodiment of ventilator arrangement according to the invention.

In the drawing, which shows a section in a diametrical plane, 1 indicates the shaft, for example vertical, of the alternator provided with a coupling plate 2 for coupling to the shaft of the turbine, and on which is keyed a hub 3 coupled, by a plurality of arms 4, to the rim 5 carrying the pole pieces 6 of the rotor 7. The stator 8 is mounted on a wall 9 supported by the foundations 10.

On either side of the rotor 7 are located, respectively, the two ventilators 11 and 12 which, in known manner, circulate the air, by way of the spaces between the pole pieces 6 of the rotor 7 and the ventilation passages provided in the stator 8, to coolers 13 whence the air escapes into a collector 14.

According to the invention, the collector 14 communicates with a zone adjacent the base of the arms on the hub 3, by way of conduits 15 and 16 respectively defined by screens 17, 18 and 19, 20.

The screens 17 and 19 extend to the full part of the hub 3, leaving only openings of small size 21.

The screens 18 and 20 extend to a diameter corresponding to the intervals defined between the arms 4. The profile of the screens 18 and 20 is such that the air drawn in by the ventilators 11 and 12 is caused to cross the zone 22, swept by the arms 4 of the rotor, which fullfil the role of vanes of a primary ventilator due to which a degree of over pressure is created upstream of the ventilators 11 and 12. The flow of air towards the ventilators can be assisted by deflectors 23, of V form, fixed to the interior of the rim 5 in each of the intervals between two arms 4.

Entries for entrained air are limited to those defined by the openings 21, and in no case do these entries have any disturbing action on the flow of air upstream of the ventilators 11 and 12.

It should be noted that the screens 17 and 19 only play a secondary role and could be done away with in certain types of alternator or be formed by known sealing means in the case of alternators of the closed type.

Experience has shown that ventilation has been markedly improved in relation to known arrangements, without the necessity of modifying the profile of the arms of the rotor; it can however be advantageous in certain particular cases, for example in the case of a rotor of average dimensions, to give the rotor arms a profile specially adapted for the role of vanes of a primary ventilator.

Nevertheless, the arrangement of ventilator such as has just been described could be modified without departing from the scope of the invention.

This is so, particularly, in that the communication between the peripheral air collector and the central part of the alternator, by way of fixed screens, could be effected on one side only of the rotor, the deflectors fixed to the interior of the rotor ensuring guidance of the air output circulated towards the two peripheral ventilators.

What I claim is:

1. Ventilator arrangement for alternators having coupling arms extending between the rotor hub and the rotor rim with a centrifugal ventilator located on each side of and in the peripheral zone of the rotor and having a peripheral air collector, comprising at least one chamber on each side of the rotor, a fixed circular screen in each of said chambers directing air from the peripheral collector towards the rotor hub and so profiled that the air adjacent the rotor hub is led to the ventilators only through the space swept by the arms, the arms supplying additional pressure to the air in advance of the ventilators.

2. Ventilator arrangement as described in claim 1 including a second fixed circular screen spaced from said first screen defining an annular feed chamber adjacent the arms, said annular chamber extending from the hub to a diameter on the arms corresponding to the interval between the arms.

3. Ventilator arrangement as described in claim 1 including deflectors secured within the rim between the arms, said deflectors guiding the air from the arms to the ventilators.

References Cited in the file of this patent

UNITED STATES PATENTS

| | | |
|---|---|---|
| 1,906,849 | Fleischmann | May 2, 1933 |
| 2,502,669 | Pollard | Apr. 4, 1950 |

FOREIGN PATENTS

| | | |
|---|---|---|
| 729,504 | Germany | Dec. 17, 1942 |